United States Patent [19]
Leith

[11] 3,754,814

[45] Aug. 28, 1973

[54] COHERENT IMAGING WITH REDUCED SPECKLE

[75] Inventor: Emmett N. Leith, Plymouth, Mich.

[73] Assignee: Battelle Development Corporation, Columbus, Ohio

[22] Filed: Jan. 19, 1971

[21] Appl. No.: 107,853

Related U.S. Application Data
[63] Continuation of Ser. No. 820,879, May 1, 1969, abandoned.

[52] U.S. Cl. ......... 350/162 R, 350/162 SF, 350/3.5
[51] Int. Cl. .............................................. G02b 5/02
[58] Field of Search .......... 350/3.5, 162 R, 162 SF; 161/1, 3, 5, 33; 240/1 R

[56] References Cited
UNITED STATES PATENTS

| 3,523,054 | 8/1970 | Heflinger et al. | 350/3.5 |
| 3,539,241 | 11/1970 | Upatnieks | 350/3.5 |
| 3,545,835 | 12/1970 | Leith et al. | 350/3.5 |
| 3,421,809 | 1/1969 | Lohmann | 350/162 SF |

OTHER PUBLICATIONS

Gerritsen et al., IEEE Jour. of Quantum Electronics, Vol. QE–4, No. 5, May, 1968, p. 376.

Upatnieks, Applied Optics, Vol. 6, No. 11, Nov., 1967, pp. 1,905–1,910.

Primary Examiner—Ronald L. Wibert
Assistant Examiner—Ronald J. Stern
Attorney—Woodcock, Washburn, Kurtz & Mackiewicz

[57] ABSTRACT

An improved technique for imaging a multiplicity of planes of non-diffuse objects, including non-diffuse transparencies, with coherent illumination which utilizes a diffusion structure having a periodic phase thereacross.

20 Claims, 9 Drawing Figures

Patented Aug. 28, 1973 3,754,814
2 Sheets-Sheet 1
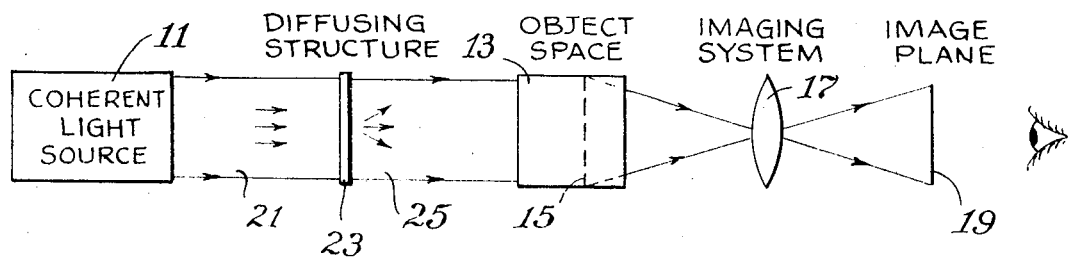
Fig.1
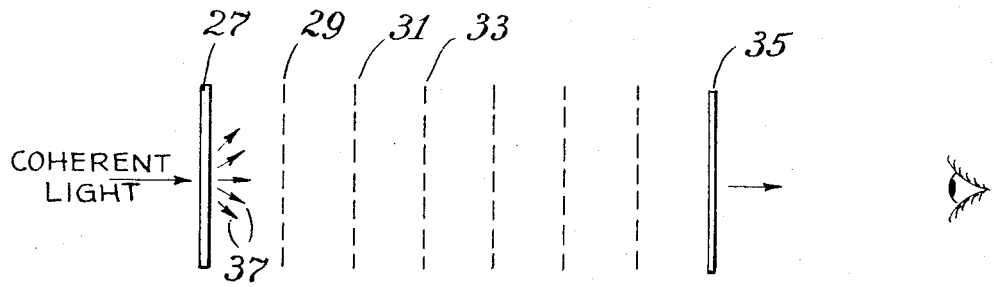
Fig.2
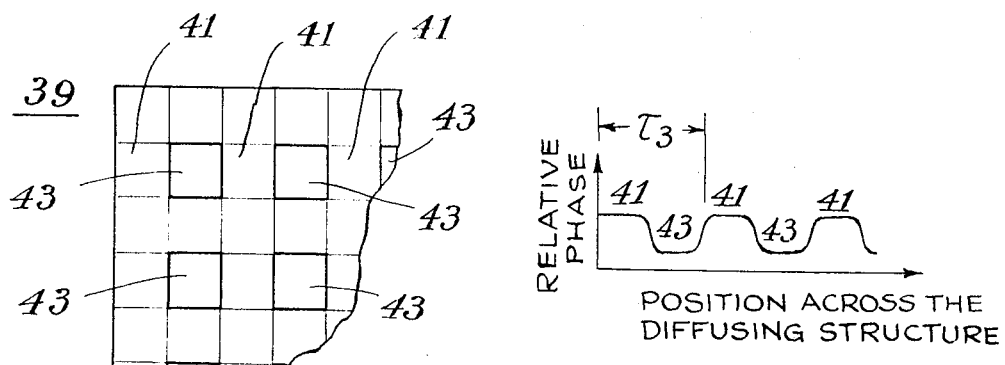
Fig.3
Fig.3A

COHERENT IMAGING WITH REDUCED SPECKLE

This application is a continuation of parent application Ser. No. 820,879 filed May 1, 1969, now abandoned.

BACKGROUND OF THE INVENTION

This invention relates generally to optical techniques of forming an image of an object and more specifically relates to imaging non-diffuse objects with coherent light illumination.

Since the use of a laser as a source of coherent light has become practical, imaging with coherent light where advantageous has become common. One application of coherent imaging is in the field of microscopy where a three-dimensional object transparency to be examined, such as a biological specimen, is illuminated with coherent light and viewed with an optical system which magnifies the information contained in the transparency many times. Another application of coherent image is in the field of holography wherein a hologram is constructed which is capable of reconstructing at a later time the wavefront initially emanating from the object. In these and other applications of coherent light illumination, it is highly desirable that an object be illuminated and viewed without unwanted information in the form of noise being introduced into an object image by the illuminating or viewing system.

The use of coherent light to illuminate a non-diffuse object such as a transparency presents a problem not encountered in ordinary incoherent imaging of such objects. A major problem encountered is the formation of dark rings in the object image resulting from such things as dust or dirt upon the object or on an element of the optical system used in the imaging process. These dark rings are much broader than the resolution capabilities of the system and will draw the observer's attention away from the object image presented and may be so severe that a portion of the object information is obliterated. Such rings are formed from interference between light which is scattered by the dust and unscattered light at the image plane.

To eliminate or reduce the formation of these undesirable dark rings which are formed along with the image of the object, a diffusion plate such as ground glass is placed in the coherent illumination beam prior to its striking the object. The diffusion plate is chosen to vary the phase across the object-illuminating beam. Illumination with such a beam prevents the aforementioned formation of broad dark rings (usually called "noise") in an image since there are no longer two highly uniform wavefronts interfering at the image plane. These dark rings are in effect broken into many dark patches, each patch being reduced in size to the resolution capability of the system. The substitution of tiny patches for the broad dark bands greatly enhances the appearance of the image and does not obscure desirable detail. The use of a diffusing plate in a coherent light transparency imaging system is more fully explained by Leith and Upatnieks in the *Journal of the Optical Society of America*, Nov., 1964, beginning at page 1,295. The use of a diffusion plate for coherent illumination in holography is also described by Leith and Upatnieks in copending application Ser. No. 361,977 filed Apr. 23, 1964, now U.S. Pat. No. 3,506,327 issued Apr. 14, 1970.

Although the use of a diffusion medium such as a ground glass plate in the object illuminating coherent light beam effectively reduces interference ring noise in the image of a non-diffuse object, another type of noise is introduced into the system by the ground glass plate. This added noise is a discernible grainy background to an image of an object which results from the existence of non-uniform intensity across the coherent beam illuminating the object. This type of noise is sometimes referred to as "speckle".

This grainy noise can be effectively eliminated by illuminating the non-diffuse object with a coherent light beam having a uniform intensity thereacross. This is reported by Uptanieks in *Applied Optics*, November, 1967 beginning at page 1,905, and also in a copending application by Upatnieks, Ser. No. 638,031, filed May 12, 1967, now U.S. Pat. No. 3,539,241 issued Nov. 10, 1970. Upatnieks describes accomplishing this result by using a pure phase plate which is characterized by random phase shifting properties across the face of the diffuser but with uniform amplitude transmission thereacross. However, such a diffuser is useful only to illuminate a two dimensional non-diffuse transparency as an object and furthermore must be placed immediately against such a transparency or imaged thereon in order to illuminate the transparency with uniform intensity. Therefore, such a random phase plate diffuser does not eliminate the grainy noise problem of coherent illumination when a three-dimensional object is desired to be illuminated in a plurality of planes with uniform intensity. Furthermore, even when only a two dimensional transparency is desired to be illuminated with uniform intensity, it is generally inconvenient to be limited in the position that the transparency must take relative to the diffuser for uniform illumination thereof.

Therefore, it is a primary object of this invention to provide an improved technique of illuminating non-diffuse three-dimensional objects with coherent light for imaging thereof.

It is also an object of this invention to image a plane of a non-diffuse transparency removed a distance downstream from a diffusing structure in a manner to substantially minimize image noise in the form of interference rings and speckle.

It is a further object of this invention to provide a coherent light beam having at any plane along a substantial length a varying phase thereacross and either uniform intensity or an intensity variation thereacross that may be utilized for illuminating an object for imaging.

SUMMARY OF THE INVENTION

These and additional objects are realized in accordance with the present invention by passing a coherent light beam through a periodic diffusing structure before striking a non-diffuse object desired to be illuminated. By "periodic structure" is meant herein a diffusing structure which alters the phase of a coherent illuminating wavefront according to a periodically varying function thereacross. A periodic structure has been found to have certain desirable characteristics for use in such a coherent illuminating system.

One of these desirable characteristics is a periodic structure's self-imaging property. By "self-imaging" is meant herein the characteristic where recurring planes downstream from the diffusing structure have an intensity distribution thereacross substantially the same as the intensity distribution across the light beam immediately upon emerging from the diffusing structure. The degree of correspondence between the intensity distribution across the self-imaging planes and the diffusing structure is dependent upon the spatial frequencies developed by the diffusing structure relative to the bandwidth of the optical system. In most cases, the intensity distribution at a self-imaging plane does not have an exact correspondence because the diffusing structure will develop certain diffracted orders of high spatial frequency which will be slot; that is, will not be captured by the object. However, if a periodic structure is chosen to have substantially uniform intensity transmission across its surface and so long as the spatial frequencies are not too high for a given optical system, its self-imaging planes downstream therefrom have an intensity distribution which is uniform enough that speckle is not introduced into an image of an object illuminated at such planes. The self-imaging planes of a periodic structure repeat with a period related to the period of the phase variation across its surface. For certain illumination applications, therefore, a periodic structure can be designed so the self-imaging planes are close enough together to adequately illuminate a three-dimensional object space within the resolution capability desired.

However, the resolution in depth of an imaging system is often desired to be greater than that made possible by illuminating an object with substantially uniform illumination only at self-imaging planes. That is, it may be desired to view an element of the object that is smaller in depth than the distance between self-imaging planes.

It has been found that the planes intermediate of the self-imaging planes may also be used to advantage for object illumination. The intensity distribution across each intermediate plane is given a period by a periodic structure which is substantially equal to the fundamental period of the phase function across the diffusing structure. Therefore, an object so illuminated may be imaged by sampling the object at periodic areas having substantially uniform intensity therebetween. This sampling may be accomplished by masking an image of the object to allow only areas of uniform intensity to pass, and later in the optical system removing the masking structure from an image by low pass spatial filtering. Alternatively, appropriate spatial filtering alone may be utilized without the aid of a mask to sample equal intensity points across a plane of the object which is imaged.

According to another aspect of the present invention, it has been found that if the phase function across the diffusion plate is chosen in a very particular manner, the period at which equal intensity points occur across an intermediate plane is much smaller than the phase function period across the diffusing structure and thus allows sampling of an image at equal intensity points thereacross which are closer together. Such a diffusing structure causes even a finer break-up of the unwanted interference patterns of the image at intermediate planes without decreasing the fundamental period of the phase function.

In designing a diffusing structure having a phase function which produces an intensity distribution at intermediate planes downstream therefrom having a period of occurrence of equal intensity points thereacross less than the fundamental period of the diffusing structure, a trial and error process has been found satisfactory. More specifically, an example technique is for a designer to choose a certain number of distinct levels of relative phases to occur within each period across of the diffusing structure and alter their relative values until the period at which equal intensity points occur across an intermediate plane is a minimum possible. The resulting diffusing structure has been referred to as a "pseudo-random" diffuser. However, it should be noted that the distinct relative phase values within each period are not randomly chosen but are carefully determined to decrease the period of occurrence of equal intensity points across intermediate planes of the diffused light beam.

The ideal coherent light beam would be one which has a random varying phase and uniform intensity thereacross at any plane along the beam. This would allow illumination of a two or three dimensional non-diffuse object, such as a non-diffuse transparency, without adding a speckled appearance to the object and without allowing the formation of dark interference rings in an image thereof caused by light scatterers somewhere in the illumination beam or in the viewing system. However, this goal is presently unattainable.

Use of the term "diffusing structure" herein is meant to refer to a structure which alters the relative phase of various points across a coherent light beam. It is unimportant to this invention the specific type of diffusing structure utilized. Such a structure, for instance, may include a light refracting medium or may diffract light, the result being the same for the purposes of the present invention.

In the context of this description, a "non-diffuse" object is one in which diffracted light scattered from within the object makes up a small percentage of the total light that is transmitted by the object.

For a more detailed understanding of the invention and for illustration of various specific forms thereof, reference should be had to the following description taken in conjunction with the accompanying drawings. For a general quantitative discussion of the subject matter herein, reference should be had to applicant's letter published in *Applied Optics*, May, 1968, pages 982–983, and to applicant's jointly authored paper appearing in *Applied Optics*, October, 1968, (Vol. 7, No. 10) beginning at page 2,085.

BRIEF DESCRIPTION OF THE DRAWINGS

FIG. 1 schematically illustrates an illumination system for the use of the techniques of the present invention.

FIG. 2 schematically illustrates certain characteristics of a diffusion structure employed in the techniques of this invention.

FIG. 3 shows one form of a periodic diffusion structure useful in the practice of this invention.

FIG. 3A illustrates the relative phase function across a line of the diffusing structure of FIG. 3.

DESCRIPTION OF THE PREFERRED EMBODIMENTS

Figure 4:
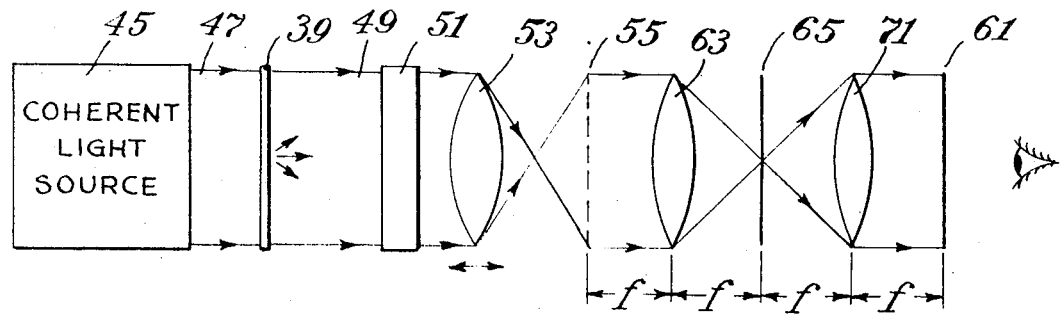
FIGS. 4, 4A and 4B schematically illustrate a method of image sampling according to this invention.

Referring to FIG. 1, a coherent light source 11 illuminates a three-dimensional object space 13 which contains object information to be viewed or imaged. For purposes of illustration, it is assumed that a particular plane 15 within the object space 13 is desired to be viewed directly or by use of an imaging system 17 to form an image of the plane 15 at an image plane 19. The imaging system 17 is schematically illustrated as a simple lens but would probably be a complex optical system, such as in the case of a microscope, or would not include a lens element at all in the case of certain types of holography. The goal is to illuminate the plane 15 and any other plane within the object space 13 in a manner that a image may be viewed at the image plane 19 without noise due to uneven intensity at the object plane 15 or dark interference rings due to undesired light scatterers in the system.

The coherent light source 11 is most conveniently a laser which emits a highly collimated beam 21 with the help of appropriate optics. Without any diffusing structure, a light scatterer such as dust on a lens will generate a spherical wavefront which interferes with the plane wavefront emitted from the laser and is viewed at the image plane as undesirable interference rings. This is especially a problem when a three-dimensional object is utilized since planes of the object other than that being viewed at a given instant may serve as light scatterers and thus generate a complex pattern of dark interference fringes. As referred to hereinabove, a diffusing structure 23 placed in the highly uniform wavefront beam 21 has been used to impart a random phase to the beam portion 25 "downstream". The interference between the spherical waves produced by the undesirable scatterers and the random phase wavefront produces patterns which are very fine and therefore less noticeable when viewed in the image plane 19.

The problem of these interference rings exists only with non-diffuse objects since if the object illuminated is diffuse, it serves as a random scatterer of light and breaks up any undesirable dark interference rings and a diffusing structure is not necessary. A common non-diffuse object utilized in coherent imaging is a transparency, and is used in the description herein. However, the invention herein has equal applicability to non-diffuse reflective objects, such as a mirror.

The problem with diffusing structures utilized before this invention is that an object plane 15 to be viewed or imaged, although of random phase which breaks up the interference rings, does not have uniform intensity thereover so adds noise to the illuminated object in the form of speckle or grain. Furthermore, this speckle cannot be removed by spatial filtering. Referring to FIG. 2, a periodic diffusing structure 27 which produces recurring self-imaging planes is illustrated which may be used according to this invention as the diffusing structure 23 in FIG. 1. If the self-imaging diffuser 27 has a uniform intensity transmission over its surface, the self-imaging planes 29, 31, 33 etc., also has substantially uniform intensity. If a two dimensional transparency 35 is placed to coincide with a self-imaging plane as shown, the transparency is viewed or imaged with substantially uniform intensity overall. The position and recurrence of the self-imaging planes downstream from the diffusing structure 27 is determined by its characteristics in scattering the incident coherent light into various orders 37.

Using the self-imaging planes for illumination of planar objects is useful since they can be illuminated substantially uniformly without having to be placed immediately against the diffusing structure. A three-dimensional object may be moved relative to the diffuser to position a self-imaging plane at a plane of the object desired to be viewed. However, it is generally desirable to illuminate a three-dimensional object in a manner so that any plane thereof may be viewed, especially if a hologram thereof is to be constructed. The diffusing structure 27 may be designed so that the self-imaging planes recur throughout a three-dimensional object often enough that viewing the three-dimensional object only at these planes is within the desired resolving power of the optical system. However, it is difficult to generate self-imaging planes close enough together for very good resolution viewing of three-dimensional objects. Therefore, it is generally preferable to be able to use the illumination at planes intermediate of self-imaging planes. It has been found that a periodic phase varying diffusing structure 27 gives illumination with a useful intensity distribution across intermediate planes for continuous three-dimensional object illumination. It has also been found that the object image at intermediate planes may be sampled at areas of equal intensity to reconstruct an image of the object with a resolution which depends upon how close the sampled equal intensity points are to each other.

A corner of the face of an appropriate periodic structure 39 is shown in FIG. 3. The area 41 will shift incident light a uniform phase amount while the squares 43 are designed to shift light striking them a different amount relative thereto. Such a diffuser may be constructed by orienting a pair of Ronchi gratings at right angles to each other on an appropriate photographic film which is then exposed, developed and bleached to a transparent state. It is preferred that the gratings be separated slightly from the film during exposure so that the boundaries between the two phase areas are not so sharp as to produce high spatial frequencies which are not passed by the system. FIG. 3A illustrates the phase function across a line of the periodic structure 39, which can be seen not to have a sudden transition between the two relative phase values.

Such a periodic phase diffusing structure has certain definite advantages. The self-imaging planes of such a structure are located at periodic intervals downstream from the diffusing plate. The primary advantage is that any plane one wants to choose between the diffuser self-imaging planes will have an intensity distribution that is also periodic and each plane has an intensity distribution of the same period. Therefore, an image of an object may be sampled at the same period across any plane thereof. The period of occurrence of self-imaging planes downstream of the diffuser and the period of the intensity distribution across each plane intermediate thereto are dependent upon the period of the phase function across the diffusing structure.

Figure 4A:
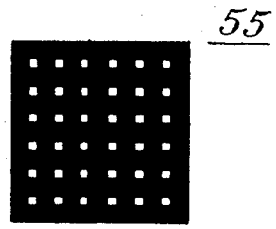

Referring to FIG. 4, a technique for sampling an image of an object illuminated by coherent light passed through the periodic diffusing structure 39 is schematically illustrated. A coherent light source 45 produces a coherent light beam 47 with a highly uniform wavefront which is passed through the periodic phase diffusing structure 39 to produce a diffuse coherent light beam 49 which is passed through a three-dimensional transparent object to be viewed, such as a biological specimen in a microscope. An objective lens 53, preferably movable to and from the object, images (may be referred to as a first object image) a desired plane of the object transparency 51 onto a mask 55. The face of the mask 55 is shown in FIG. 4A which includes areas of varying opacity and transmissivity, alternating across the surface. This mask is positioned to allow areas of the object image of uniform intensity only to pass, thereby throwing away other areas of the object imaged.

Figure 4B:
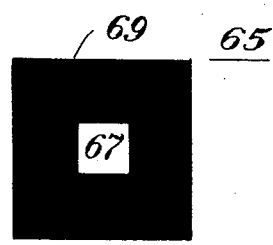

This masked image is then spatially filtered to remove the mask and reconstruct an image (may be referred to as the second object image) of the object plane viewed at the image plane 61 of FIG. 4. A lens 63 is positioned to bring the mask image to a focus at a spatial filter 65. Since we have assumed collimated light throughout this illustration, the lens 63 will be placed its focal length $f$ from the mask image and the spatial filter is placed a distance $f$ on the other side of the lens 63. As is well-known, the intensity distribution at the spatial filter 65 is the Fourier transform of the intensity distribution at the mask 55. The spatial filter 65 is positioned at what is often called the "frequency plane" and allows manipulation of the image which cannot be done easily in other ways. The spatial filter 65 is shown in FIG. 4B which passes low spatial frequencies through a transparent area 67 while blocking high spatial frequencies of the masked image at an opaque area 69. Another lens 71 is placed a distance equal to its focal length, which also may be $f$, on the other side of the spatial filter 65 to reconstruct an image of the desired object plane absent the mask 55 at the image plane 61 located a distance $f$ on the opposite side of the lens 71. Alternatively, appropriate spatial filtering without use of a mask may be employed.

The period of the phase function across such a periodic structure as illustrated in FIG. 3 determines the size of the dark segments remaining in the image from the broken-up interference rings as well as determining the distance between equal intensity points. The lower this period (the more "rapid" the phase variation), the smaller are the undesirable dark interference spots and the closer are points of equal intensity across the illumination beam.

It is often desirable to reduce the size of such dark spots and to increase the frequency of occurrence of equal intensity points across the coherent beam at planes intermediate of self-imaging planes, without reducing the period of the phase variation across the diffusing structure. It has been discovered that these objectives may be realized by constructing a diffusing structure with a phase function more complex than that of the FIG. 3 structure but one having approximately the same fundamental period thereacross.

Figure 5:
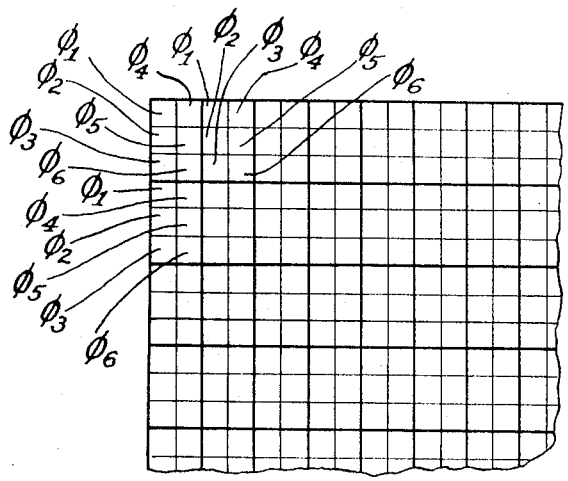
FIG. 5 illustrates a periodic diffusion structure which may be utilized in the practice of the present invention.
Figure 5A:
FIG. 5A illustrates a typical phase function across a line of the diffusing structure of FIG. 5.

An example of such a diffusing structure is illustrated in FIG. 5 wherein six distinct phase values have been chosen for illustration, designated as $\phi_1$, $100_2$, $\phi_3$, $\phi_4$, $\phi_5$, $\phi_6$. It should be noted that the rectangle of three individual phase shifting squares on the vertical by two squares on the horizontal comprises the basic element of the diffusing structure which is repeated periodically thereacross. FIG. 5A shows a possible phase function across a vertical line of the FIG. 5 diffusing structure. It may be noted that within a single period $\tau_5$, the phase function is more complex than that within a period $\tau_3$ of FIG. 3A. It should also be noted that the phase variation within a period may be a continuous function but is illustrated here to have discrete values $\phi_1$, $\phi_2$, and $\phi_3$. Having discrete phase values allows one constructing a diffuser for a particular application to manipulate these relative values until it is determined mathematically that points of equal intensity occur across a desired downstream plane at intervals close enough together so that sampling such equal intensity points will construct an image of desired resolution. Once these relative phase values are determined, the diffuser may be constructed by holographic techniques and inserted into an imaging system such as that of FIG. 4 as described hereinabove.

It shall be understood the invention is not limited to the specific arrangements shown, and that changes and modifications may be made within the scope of the appended claims.

What is claimed is:

1. A method for illuminating a non-diffuse object with coherent light, comprising the steps of:
   directing a beam of coherent light toward the non-diffuse object,
   positioning a light diffuser in the path of said coherent light beam, said diffuser characterized by a continuous smoothly varying periodic relative phase function and substantially uniform intensity transmittance thereacross, thereby alone forming several planes of substantially uniform intensity thereover across the diffused beam at various intervals along its length, said substantially uniform intensity planes occurring only where the diffuser self-images, and
   positioning the object in the path of the diffused beam a distance from the diffuser with at least one plane of the object coinciding with a self-imaging plane of the diffused beam having substantially uniform intensity.

2. A method of illuminating a non-diffuse object and forming an image thereof, comprising the steps of:
   directing coherent light in an illuminating beam toward said object,
   diffusing said illuminating beam prior to striking the object to illuminate some portions of the object with light of substantially equal intensity, and other portions with light of different intensity
   forming a first image of the illuminated object,
   sampling portions of said first image corresponding to portions of the object illuminated with light of substantially equal intensity, and
   forming a second image of said object only from the sampled portions of said first image, thereby to discard information of the object between sampled areas.

3. The method according to claim 2 wherein the step of diffusing the coherent beam includes passing said beam through a diffusing structure which is characterized by substantially uniform intensity transmittance and by a periodically varying phase function thereacross.

4. The method according to claim 3 wherein the step of sampling portions of the first image includes the step of placing a mask over said first image of the object to block all but the sampled portions, and wherein the step of forming a second image includes spatially filtering the mask from the sampled first image of the object.

5. A method of illuminating a non-diffuse object and forming an image thereof, comprising the steps of:
   directing coherent light in an illuminating beam toward said object,
   diffusing said illuminating beam across a diffusing surface prior to striking the object by altering the relative phase across said beam according to a periodically varying relative phase function across said surface, whereby at least one plane along the diffused beam has substantially equal light intensity areas distributed periodically thereacross and other areas of different light intensity, positioning said object in the path of the diffused beam so that at least one plane of said object is coincident with said at least one plane of said diffused beam, and forming a sampled image only from portions of the object's said at least one plane that are illuminated by said substantially equal light intensity areas of said beam.

6. The method according to claim 5 wherein the step of diffusing said beam includes adjusting the relative phase function period across the diffusing surface so that said substantially equal light intensity areas occur periodically across said at least one plane of the diffused beam with a period substantially equal to or less than an object element size which is desired to be resolved in the image of the object.

7. The method according to claim 5 wherein the step of forming a sampled image includes the steps of placing a mask over a first image of the object to block all but areas thereof corresponding to portions of the object that are illuminated by said substantially equal light intensity areas of said beam, and spatially filtering the mask from the masked first image of the object, thereby forming said sampled image of the object.

8. A system for illuminating a non-diffuse object with coherent light, comprising, a source of a coherent light beam, a diffuser located in the path of said light beam, said diffuser characterized by a continuous smoothly varying periodic relative phase function thereacross and a substantially uniform light transmittance thereover, thereby producing a diffused light beam with a plurality of planes therealong of substantially uniform intensity across the beam, said substantially uniform intensity planes ocurring only where said diffuser self-images, and a non-diffuse object positioned in the path of said diffused light beam coincident with at least one of said plurality of substantially uniform intensity planes a distance from the diffuser.

9. The improved system according to claim 8 wherein the period of said phase varying structure is small enough so the self-imaging planes repeat within a distance equal to the smallest object element size desired to be resolved in an image.

10. The improved system according to claim 8 wherein the period of said phase varying structure is small enough so that points of substantially equal intensity repeat across planes intermediate of self-imaging planes with a period equal to or less than the smallest object element size desired to be resolved in an image.

11. A system for viewing a non-diffuse object with coherent light, comprising:

a source of a coherent light beam, a diffuser positioned in the path of said coherent light beam, said diffuser characterized by a periodic relative phase varying function thereacross, thereby generating a diffused coherent light beam characterized by a plurality of diffuser self-imaging planes recurring periodically along the duffused beam with planes intermediate of said self-imaging planes having repetitive points thereacross of substantially equal intensity and other points of different intensity, a non-diffuse object positioned in the path of said diffused coherent light beam for illumination thereby, and means for sampling the illuminated object at points thereacross corresponding to said points of substantially equal intensity that recur across intermediate planes of said diffused light beam for forming an object image from the sampled object points.

12. A coherent viewing system according to claim 11 wherein said means for sampling includes a mask of periodically varying light transmission.

13. A coherent viewing system according to claim 12 wherein said means for sampling additionally includes appropriate low pass spatial filtering apparatus for removing said mask from said object image.

14. A coherent viewing system according to claim 11 wherein said diffuser is additionally characterized by substantially uniform light transmittance thereover.

15. A coherent viewing system according to claim 14 wherein the periodic relative phase varying function of said diffuser consists of at least three distinct levels of relative phase change in each period across the diffuser in at least one direction.

16. A method of illuminating a non-diffuse object and forming an image thereof, comprising the steps of:

generating a coherent light beam with at least one plane therealong having distributed thereacross predetermined areas of substantially equal light intensity and other areas of different light intensity, positioning a non-diffuse object in the path of said beam coincident with said at least one plane, and forming a sampled image only from portions of said object coincident with said at least one light beam plane that are illuminated by said substantially equal light intensity areas.

17. The method according to claim 16 wherein the step of generating a coherent light beam includes passing a light beam from a coherent light source through a diffuser having in at least one direction across the beam a plurality of distinct relative phase values joined together thereacross in the nature of a step function as opposed to a continuous smoothly varying relative phase function.

18. The method according to claim 17 wherein said diffuser includes at least three distinct relative phase values across the beam in said at least one direction.

19. The method according to claim 17 wherein said diffuser includes at least three distinct relative phase values which form a period of phase variation that is repeated across the diffuser in said at least one direction.

20. A method of illuminating and imaging a non-diffuse object with coherent light, comprising the steps of:

directing a beam of coherent light toward the non-diffuse object, positioning a light diffuser in the path of said coherent light beam, said diffuser characterized by a continuous smoothly varying periodic relative phase function and substantially uniform intensity transmittance thereacross, thereby generating a diffused coherent light beam characterized by a plurality of diffuser self-imaging planes recurring periodically along the diffused beam and having substantially uniform intensity thereacross only at said self-imaging planes, positioning the non-diffuse object in the path of the diffused beam a distance from the diffuser coincident with a self-imaging plane of the diffused beam that has substantially uniform intensity thereacross, and imaging the illuminated object with an optical system that captures substantially all spatial frequencies developed by said light diffuser.

* * * * *

UNITED STATES PATENT OFFICE
CERTIFICATE OF CORRECTION

Patent No. 3,754,814    Dated August 28, 1973

Inventor(s) Emmett N. Leith

It is certified that error appears in the above-identified patent and that said Letters Patent are hereby corrected as shown below:

Column 3, line 8, change the word "slot" to --lost--.

Column 7, line 53, change "100" to --∅--.

Column 9, line 66, correct spelling of "duffused" to --diffused--.

Signed and sealed this 18th day of December 1973.

(SEAL)
Attest:

EDWARD M. FLETCHER, JR.
Attesting Officer

RENE D. TEGTMEYER
Acting Commissioner of Patents